United States Patent
Ikeno et al.

(10) Patent No.: US 10,395,653 B2
(45) Date of Patent: Aug. 27, 2019

(54) VOICE DIALOG DEVICE AND VOICE DIALOG METHOD

(71) Applicant: TOYOTA JIDOSHA KABUSHIKI KAISHA, Toyota-shi, Aichi-ken (JP)

(72) Inventors: Atsushi Ikeno, Kyoto (JP); Muneaki Shimada, Tokyo-to (JP); Kota Hatanaka, Kama (JP); Toshifumi Nishijima, Kasugai (JP); Fuminori Kataoka, Nisshin (JP); Hiromi Tonegawa, Okazaki (JP); Norihide Umeyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/598,504

(22) Filed: May 18, 2017

(65) Prior Publication Data

US 2017/0345425 A1    Nov. 30, 2017

(30) Foreign Application Priority Data

May 27, 2016    (JP) .................................. 2016-106692

(51) Int. Cl.
*G10L 21/00* (2013.01)
*G10L 15/22* (2006.01)
(Continued)

(52) U.S. Cl.
CPC .............. *G10L 15/22* (2013.01); *G06F 3/013* (2013.01); *G06F 3/0304* (2013.01); *G06F 3/167* (2013.01); *G10L 15/02* (2013.01); *G10L 15/08* (2013.01); *G10L 15/24* (2013.01); *G10L 25/78* (2013.01); *G06F 2203/0381* (2013.01); *G06K 9/0061* (2013.01); *G06K 9/00255* (2013.01); *G06K 9/00281* (2013.01); *G06K 9/00604* (2013.01); *G10L 2015/223* (2013.01); *G10L 2015/227* (2013.01)

(58) Field of Classification Search
None
See application file for complete search history.

(56) References Cited

U.S. PATENT DOCUMENTS 6,076,061 A      6/2000  Kawasaki et al.
8,854,303 B1 *  10/2014  Cho ........................ G06F 3/012
                                                  345/156
(Continued)

FOREIGN PATENT DOCUMENTS

JP    H08-83093 A      3/1996
JP    2006-272471 A   10/2006
(Continued)

*Primary Examiner* — Richard Z Zhu
(74) *Attorney, Agent, or Firm* — Oliff PLC

(57) ABSTRACT

A voice dialog device, comprises a sight line detection unit configured to detect a sight line of a user; a voice processing unit configured to obtain voice pronounced by the user and a result of recognizing the voice; a dialog determination unit configured to determine whether or not the voice dialog device has a dialog with the user; and an answer generation unit configured to generate an answer, based on a result of recognizing the voice, wherein the dialog determination unit determines whether or not the user has started the dialog, based on both the sight line of the user and the obtained voice.

4 Claims, 4 Drawing Sheets

(51) Int. Cl.
  *G06F 3/01*   (2006.01)
  *G10L 15/02*  (2006.01)
  *G10L 15/08*  (2006.01)
  *G10L 15/24*  (2013.01)
  *G10L 25/78*  (2013.01)
  *G06F 3/16*   (2006.01)
  *G06F 3/03*   (2006.01)
  *G06K 9/00*   (2006.01)

(56) References Cited

U.S. PATENT DOCUMENTS

| | | | |
|---|---|---|---|
| 9,418,653 B2* | 8/2016 | Sekiguchi | G10L 15/083 |
| 2003/0154084 A1* | 8/2003 | Li | G06K 9/00228 |
| | | | 704/273 |
| 2011/0106531 A1* | 5/2011 | Liu | G06F 17/30743 |
| | | | 704/214 |
| 2012/0295708 A1* | 11/2012 | Hernandez-Abrego | |
| | | | G06F 3/013 |
| | | | 463/36 |
| 2014/0350942 A1* | 11/2014 | Kady | B60R 16/0231 |
| | | | 704/275 |
| 2015/0062168 A1* | 3/2015 | Ng-Thow-Hing | G02B 27/01 |
| | | | 345/633 |
| 2015/0109191 A1* | 4/2015 | Johnson | G10L 15/22 |
| | | | 345/156 |
| 2017/0162197 A1* | 6/2017 | Cohen | G10L 25/63 |
| 2017/0270924 A1* | 9/2017 | Fleurence | B60Q 3/80 |

FOREIGN PATENT DOCUMENTS

| | | |
|---|---|---|
| JP | 2007-181888 A | 7/2007 |
| JP | 2015-013351 A | 1/2015 |

* cited by examiner

VOICE DIALOG DEVICE AND VOICE DIALOG METHOD

CROSS REFERENCE TO RELATED APPLICATION

This application claims the benefit of Japanese Patent Application No. 2016-106692, filed on May 27, 2016, which is hereby incorporated by reference herein in its entirety.

BACKGROUND OF THE INVENTION

Field of the Invention

The present invention relates to a device for dialog with a user by voice.

Description of the Related Art

In recent year, developed are robots for providing various information through dialog with persons. For example, Japanese Patent Application Laid-open No. 2015-013351 discloses a communication robot that processes, on a network, voice having been input by a microphone, and returns by voice a response to the input.

When a robot has a dialog with a person by voice, it is necessary to appropriately determine a start and termination of the dialog. This is because, without this determination, the robot responds to unrelated voices, and correct communication cannot be performed.

In a method, as one of methods for determining a start of a dialog, a call is made with a keyword. For example, the voice assistant function of mobile computers widely used recently detects a specific keyword and automatically starts a dialog. By applying this function, it is possible, for example, to build up a system whose robot starts a dialog in response to a call to the robot by a person.

SUMMARY OF THE INVENTION

On the other hand, when a user tries to start a dialog by calling by voice, a problem of false recognition is caused. For example, if a word for calling, the name of the robot or the like is included in a conversation between users, the robot may respond even if neither of the users is not speaking to the robot.

If a user tries to make a trigger for starting a dialog by physical contact other than voice, an action to the robot is necessary, which results in reducing convenience.

The present invention has been developed in consideration of the above problem, and an object of the invention is to provide a voice dialog device that enables starting a dialog by a natural action.

The present invention in its one aspect provides a voice dialog device, comprising a sight line detection unit configured to detect a sight line of a user; a voice processing unit configured to obtain voice pronounced by the user and a result of recognizing the voice; a dialog determination unit configured to determine whether or not the voice dialog device has a dialog with the user; and an answer generation unit configured to generate an answer, based on a result of recognizing the voice, wherein the dialog determination unit determines whether or not the user has started the dialog, based on both the sight line of the user and the obtained voice.

A voice dialog device according to the present invention determines whether or not a user has performed calling, based on both "sight line of a user" and "voice pronounced by the user". The determination based on sight line may be performed by the use of the direction of a sight line, a change in the direction of the sight line, or the like. For example, determination may be made as to whether or not the sight line of the user is in the direction toward the voice dialog device, or as to whether or not the sight line of the user is in a certain different direction. Further, for determination by voice, a keyword may be used. For example, determination may be made as to whether or not a keyword for starting a dialog has been pronounced.

Incidentally, the voice processing unit may recognize an obtained voce by itself or may obtain a recognition result by the use of a different unit. For example, arrangement nay be such that the obtained voice is transferred to a voice recognition device outside the voice dialog device, and then a recognition result is obtained.

The answer generation unit generates an answer to be provided to the user, based on a recognition result of the voice. Incidentally, the answer can be anything that is a response to content which the user has spoken, without being limited to an answer to a question. For example, in case that a content that the user has spoken is a sentence of a question, an answer may be obtained by searching a database or searching over a network, and in case of a chat, a response may be obtained, based on a dialog scenario (dialog dictionary) arranged in advance.

By such an arrangement, as it is determined whether or not the user has started speaking to the voice dialog device, based on both the sight line of and the voice of the user, false response can be reduced.

Also, when the sight line of the user is in a certain direction, and a start keyword has been detected from the voice, the dialog determination unit may determine that the user has started a dialog.

The certain direction is typically the direction in which the user fixes his/hers eyes on the voice dialog device, however, not limited thereto. In a case that there is another object to which the user should fix his/her eyes, for example while the user is driving a car, this direction may be applied as the certain direction. Further, if an interface device for performing communication with the user is independent from the main body, the certain direction may be the direction in which the user fixes his/her eyes on this interface device. By applying both the facts that the sight line is in the certain direction and that a start keyword has been detected, to a trigger for a dialog start, it is possible to ensure determination of the will of the user to start a dialog.

Also, when the voice dialog device has the dialog with the user and a termination keyword has been detected from the voice, the dialog determination unit may determine that the dialog has been terminated.

The determination of the termination of a dialog may be made, based only on presence/absence of a termination keyword, without using information on the sight line. In such a manner, by using the sight line only in starting a dialog, the load on the user can be reduced.

Also, the voice dialog device may further comprise a state determination unit configured to determine a state of the user, and when the user is in a certain state, the dialog determination unit may omit determination based on the sight line and determines a start of a dialog.

The state determination unit determines what the user is doing, for example, determines that the user is driving a car, operating a computer, or viewing television. By determining the state of the user, when it is difficult for the user to move the sight line, for example during driving a car, determination based on the sight line can be omitted. Incidentally, the state determination unit does not always need to directly sense the user as long as it is possible to estimate what the user is doing.

Also, when the dialog determination unit has determined that the user is driving, the dialog determination unit may omit determination based on the sight line, and determines a start of a dialog.

Whether or not the user is driving a car may be determined based on a result of sensing the user, or may be determined based on the setting place of the device. For example, if it is detected that the device has been carried into a car, it may be determined that the user driving a car. Further, determination may be made, based on a result of sensing a fact other than this (for example, the operation state of an engine).

Also, the voice dialog device may further comprise a state determination unit configured to determine a state of the user, and the dialog determination unit may switch the certain direction in accordance with the determined state of the user.

In such a manner, it is possible to improve the usability by switching the certain direction in accordance with to the state of the user.

Incidentally, according to the present invention, it is possible to specify a voice dialog device as one that includes at least a part of the above-described units. Further, it is also possible to specify a voice dialog method for the above-described voice dialog device. As long as technical contradiction does not occur, the above-described process and units can be freely combined in carrying out the invention.

According to the present invention, it is possible to provide a voice dialog device capable of starting a dialog by a natural action.

DESCRIPTION OF THE EMBODIMENTS

First Embodiment

A preferable embodiment according to the present invention will be described below, referring to drawings.

A voice dialog system in the present embodiment is a system that obtains voice pronounced by a user, performs voice recognition of the voice, generates a response sentence, based on a recognition result, and thus performs dialog with the user.

System Configuration

Figure 1:
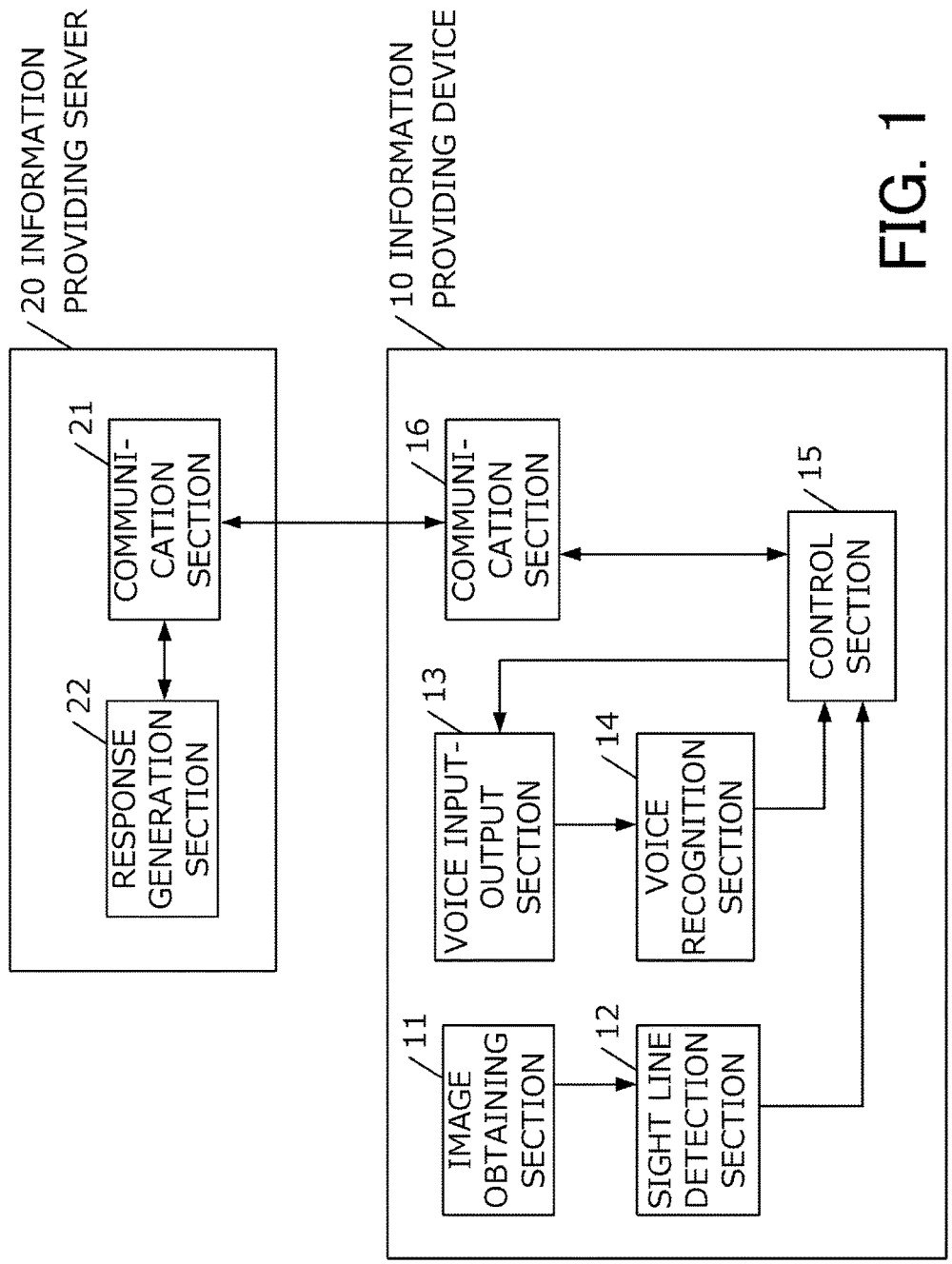
FIG. 1 is a system configuration diagram of a voice dialog system in a first embodiment.

FIG. 1 is a system configuration diagram of the voice dialog system in the present embodiment. The voice dialog system in the present embodiment is configured with an information providing device 10 and an information providing server 20.

First, the information providing device 10 will be described. The information providing device 10 is a device having a function to obtain voice from the user of the device and recognize the voice, and a function to transmit recognized content to the information providing server 20, obtain a response from the information providing server 20, and output voice. The information providing device 10 may be, for example, a car navigation device mounted on a vehicle or a general-purpose computer. Further, the information providing device 10 may be a communication robot or the like.

The information providing device 10 is configured with an image obtaining section 11, a sight line detection section 12, a voice input-output section 13, a voice recognition section 14, a control section 15, and a communication section 16.

The image obtaining section 11 is a unit for obtaining, by a camera, an image (hereinafter, referred to as a face image) including the face of a user. In the present embodiment, the image of the face of the user is captured, by a camera attached to the front surface of the device. The camera may be one for obtaining RGB images, or may be a camera for obtaining gray scale images or infrared images. A face image obtained by the image obtaining section 11 is transmitted to the later-described sight line detection section 12. Incidentally, the camera may be provided independently from the device as long as the camera can capture the image of the face of the user.

Based on the face image obtained by the image obtaining section 11, the sight line detection section 12 detects the direction of the sight line of the user. The direction of the sight line can be obtained, for example, by detecting the region of the face from the obtained image, detecting the region of eyes included in this face region, and detecting the positions of cornea reflection and pupils included in the eye region. As the technology for recognizing the direction of sight line and the eye fixing point is known, detailed description of it will be omitted. A detection result is transmitted to the later-described control section 15.

The voice input-output section 13 inputs and outputs voice from and to the user. Concretely, by a microphone, not shown, the voice is electrically converted into an electrical signal (hereinafter, referred to as voice data). The obtained voice data is output to the later-described voice recognition section 14. The voice input-output section 13 converts voice data transmitted from the control section 15 into voice by a speaker, not shown.

The voice recognition section 14 performs voice recognition on the voice obtained by the voice input-output section 13, and converts it into texts. The voice recognition can be carried out by a known technology. For example, the voice recognition section 14 stores an acoustic model and a recognition dictionary. The voice recognition section 14 compares the obtained voice data and the acoustic model, extracts the characteristic and performs matching between the extracted characteristic and the recognition dictionary to thereby perform voice recognition. A recognition result is transmitted to the control section 15.

The control section 15 communicates with the information providing server 20, based on the result of the voice recognition performed out by the voice recognition section 14, and obtains a response. Concretely, the control section 15 transmits texts obtained as a result of the voice recognition to the later-described information providing server 20 via the later-described communication section 16, and receives a corresponding response from the information providing server 20. Further, the control section 15 converts the response into voice by a voice synthesizing function, and provides the voice to the user via the voice input-output section 13. In such a manner, the user can have a dialog with the information providing device 10 in a natural language.

In the first embodiment, the control section 15 performs communication with the information providing server 20 only when a flag (hereinafter, referred to as the dialog flag) representing the fact that dialog with the user is currently performed is "True", and does not perform communication other words, does not respond to the user) when the dialog flag is "False". The dialog flag is controlled in the control section 15, and "True" and "False" are switched, based on the above-described two, namely "sight line of the user" and "voice recognition result". The detailed contents of the process will be described later.

The communication section 16 accesses a network via a communication line (for example, a mobile phone network) to thereby perform communication with the information providing server 20.

The information providing server 20 is a server device for collecting information to be provided to the user, and configured with a communication section 21 and a response generation section 22.

As the function of the communication section 21 is similar to that of the above-described communication section 16, detailed description will be omitted.

The response generation section 22 generates or obtains information to be provided to the user, based on texts obtained from the information providing device 10. Information to be provided may be, for example, information obtained by searching in a database or may be information obtained by web searching. Further, information to be provided may not be an answer to a question. For example, in case that the information providing device 10 is a communication robot, the information may be a response selected from dialog scenario (dialog dictionary). In addition, texts to be input and information to be provided may be of any kind as long as information can be provided through natural language processing. The information obtained by the response generation section 22 is transmitted to the information providing device 10 in a text format, and thereafter output to the user as a synthesized voice.

Both the information providing device 10 and the information providing server 20 can be configured as an information processing device having a CPU, a main storage device, and an auxiliary storage device. A program stored in the auxiliary storage device is loaded to the main storage device, and then executed by the CPU. Thus, the respective units shown in FIG. 1 function. Incidentally, the entire or a part of the functions shown in the figure may be executed by a circuit dedicatedly designed.

Process Flowchart

Figure 2:
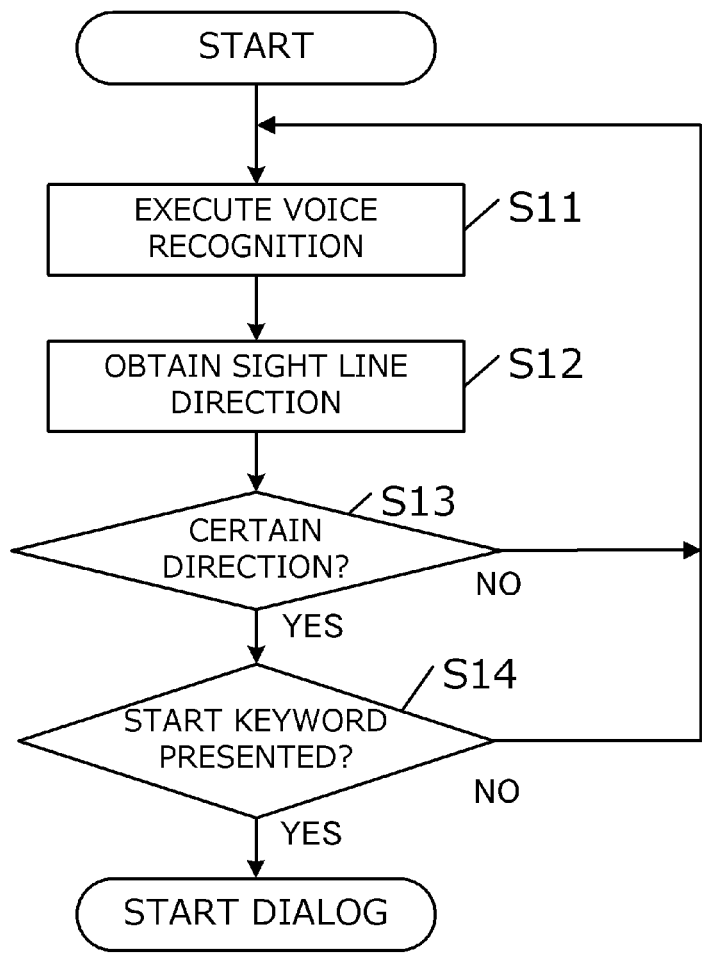
FIG. 2 is a flowchart diagram of a process performed by an information providing device 10.

In the following, the concrete contents of the process performed by the information providing device 10 will be described. FIG. 2 shows a flowchart of a process that is executed by the information providing device 10 in case that the dialog flag is "False" (in other words, in a state of recognizing that the information providing device 10 is "not in a dialog").

First, in step S11, the voice input-output section 13 obtains voice from the user of the device through a microphone not shown. The obtained voice is converted into voice data and transmitted to the voice recognition section 14. Then, the voice recognition section 14 performs voice recognition on the obtained voice data and converts the voice data into texts. The texts as a result of the conversion are transmitted to the control section 15.

Subsequently, in step S12, the image obtaining section 11 obtains a face image, and the sight line detection section 12 obtains the direction of the sight line of the user, based on this face image.

Subsequently, in step S13, the control section 15 determines whether or not the direction of the sight line transmitted from the sight line detection section 12 is in a certain direction. In the present embodiment, if the sight line of the user is in the direction toward the information providing device 10, "Yes" is determined in step S13. If the sight line of the user is not in the direction toward the information providing device 10, the process returns to step S11.

In step S14, the control section 15 determines whether or not a start keyword is included in the texts output by the voice recognition section 14. Any start keyword can be applied, and for example, if the information providing device 10 is a robot having a nickname, the start keyword may be this nickname. Further, the start keyword may be a word for calling. It a start key is not included in the recognized content, the process returns to step S11.

If "Yes" is determined in both steps S13 and S14, the control section 15 determines that the user has a will of dialog, and sets the dialog flag to "True". As a result, the process shown in FIG. 3 starts.

Figure 3:
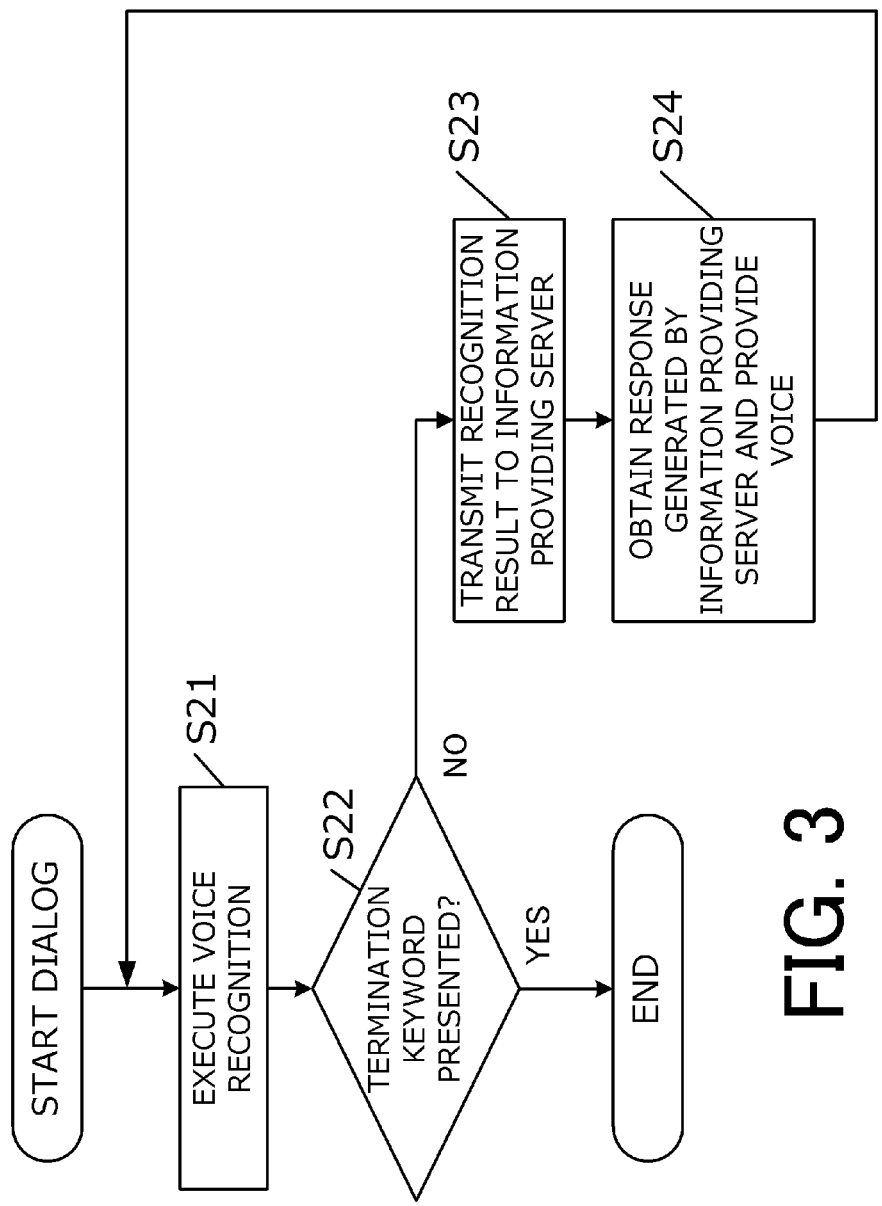
FIG. 3 is a flowchart diagram of a process performed by the information providing device 10.

FIG. 3 is a flowchart diagram representing the process that is executed by the control section 15 when the dialog flag is "True".

First, in step S21, the voice input-output section 13 obtains voice from the user of the device through the microphone not shown, the voice recognition section 14 performs voice recognition on the obtained voice data, and converts the voice into texts. The texts as a result of the conversion are transmitted to the control section 15.

In step S22, the control section 15 determines whether or not a termination keyword is included in the texts output from the voice recognition section 14. If a termination keyword included in the texts, the dialog is set to "False", and the process is terminated.

If a termination keyword is not included in the texts output from the voice recognition section 14, the control section 15 transmits the texts as a result of the recognition to the information providing server 20 (step S23). When the information providing server 20 has received the texts, the response generation section 22 generates a corresponding response.

Subsequently, in step S24, the control section 15 obtains this response from the information providing server 20 and provides the response (voice output) to the user via the voice input-output section 13.

As has been described above, if the sight line of the user is in a certain direction and a start keyword is recognized by voice, the information providing device in the present embodiment determines that a dialog between the user and the device has started, and starts a real-time dialog process.

By this arrangement, it is possible to start a dialog with the information providing device without applying a load to the user. Further, by using not only voice but also the direction of a sight line, it is possible to reduce unintended response caused the information providing device.

Second Embodiment

In a second embodiment, an information providing device 10 obtains the state of the user and changes a determination logic based on the sight line, corresponding to the obtained state.

Figure 4:
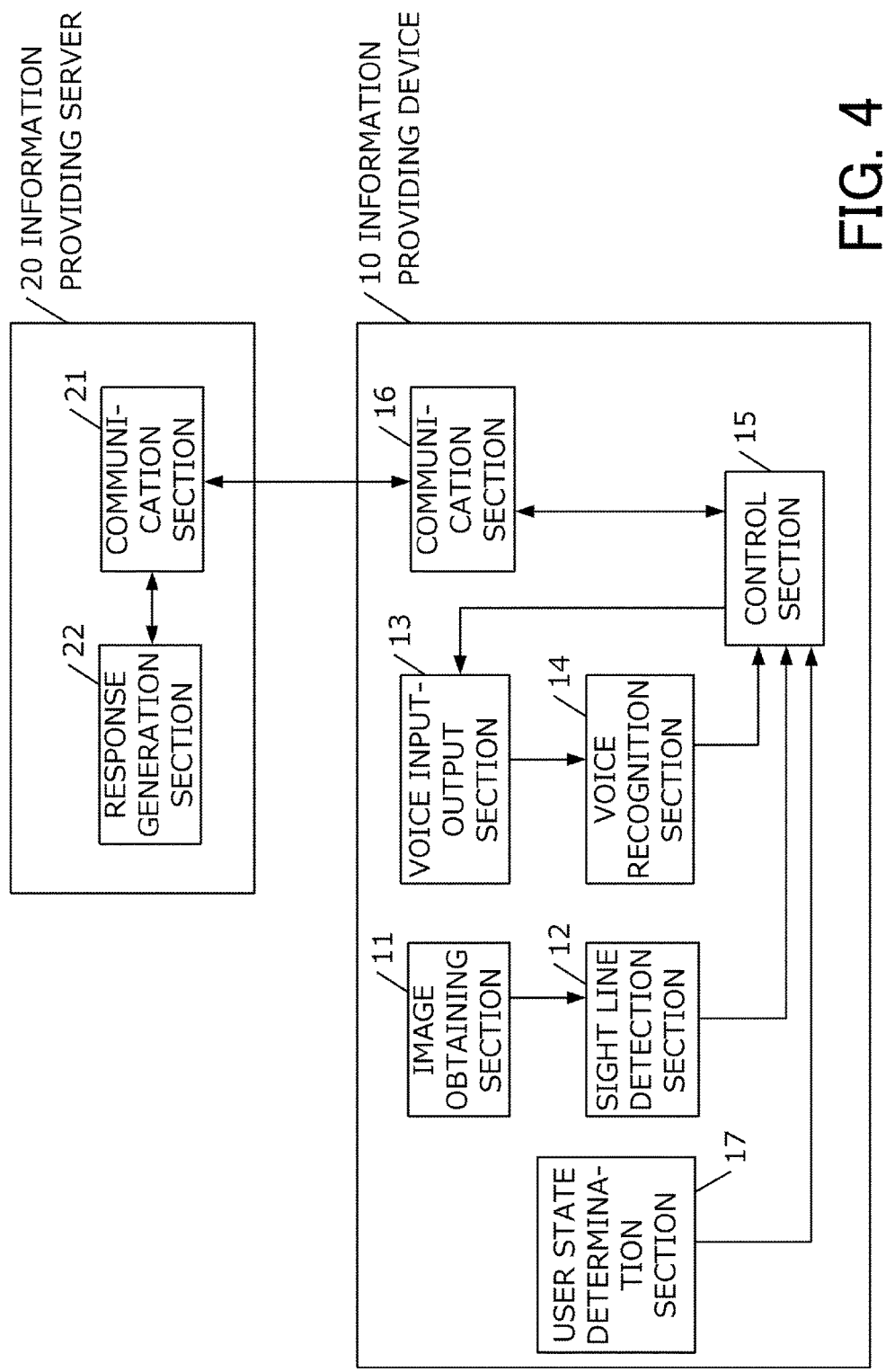
FIG. 4 is a system configuration diagram of a voice dialog system in a second embodiment.

FIG. 4 is a system configuration diagram of a voice dialog system in the second embodiment. The information providing device 10 in the present embodiment is different from the information providing device 10 in the first embodiment in that a user state determination section 17 is provided. As other units are similar to those in the first embodiment, although the differences will be described, detailed description will be omitted.

The user state determination section 17 determines whether or not the user of the device is driving a car. Whether or not the user is driving a car may be determined, for example, based on a result of sensing the user, or may be determined, based on data obtained from a sensor provided in the car. Further, it may be determined, according to, for example, the place where the device itself is set. For example, it may be determined that the user is driving the car, when the information providing device 10 is set on a base seat arranged in the car. Further, determination may be made, based on an image of the user obtained by an image obtaining section 11.

A determination result is transmitted to a control section 15.

In the second embodiment, in a case the control section 15 has received information "The user is driving." from the user state determination section 17, a certain direction in step S13 is set to "vehicle forward direction", and set to "direction toward the information providing device 10" in other cases.

In such a manner, in the second embodiment, the directions to which the user should fix his/her eyes are switched, based on the state of the user. Thus, even in a situation that it is difficult for the user to fix his/her eyes on the device, a dialog can be started.

Incidentally, in the present embodiment, in case that the user is driving, the certain direction is set to "vehicle forward direction", however, the certain direction may be set to a different direction. Further, in case that the user is driving, determination of the sight line may be omitted.

Further, in the present embodiment, whether or not the user is driving determined, however, whether or not the user is in a state other than this may be determined. Still further, in case that the user is in certain state, determination based on line may be omitted. It is also possible to determine the state of the user from plural states set in advance, and set different sight line directions, corresponding to the respective determined states.

Modified Example

The above-described embodiments are no more than examples, and the invention can be carried out with appropriate modifications and changes in a scope without departing from the spirit of the invention.

For example, in the description of the above-described embodiments, the voice recognition section 14 performs voice recognition, however, voice recognition may be performed by the information providing server 20. In this case, the information providing device 10 may transmit voice data. Further, arrangement may be made such that the voice recognition section 14 is configured to be able to recognize only a start keyword and a termination keyword, and other voice recognitions are performed by the information providing server 20.

Further, in the description of the above embodiments, the information providing device 10 performs dialog with the user, however, a unit for interaction with the user may be separated from the information providing device 10. For example, arrangement may be made such that a robot independent from the information providing device 10 is provided, and the image obtaining section 11 and the voice input-output section 13 are arranged on the robot. In this case, arrangement may be made such that the robot and the information providing device 10 perform wireless communication, and transmit and receive images and voice data. In this case, arrangement may be made such that the certain direction in step S13 is set to a direction in which the user fixes his/her eyes on the robot.

What is claimed is:
1. A voice dialog device, comprising:
a sight line detection unit configured to detect a sight line of a user;
a state determination unit configured to determine a state of the user;
a voice processing unit configured to obtain voice pronounced by the user and a result of recognizing the voice;
a dialog determination unit configured to determine whether or not the voice dialog device has a dialog with the user; and
an answer generation unit configured to generate an answer, based on a result of recognizing the voice,
wherein the dialog determination unit determines whether or not the user has started the dialog, based on both the sight line of the user and the obtained voice by:
when the determined state of the user is driving a vehicle, the detected sight line of the user is in a vehicle forward direction, and a start keyword has been detected from the voice, the dialog determination unit determines that the user has started a dialog,
when the determined state of the user is driving a vehicle and either the detected sight line of the user is not in the vehicle forward direction or the start keyword has not been detected from the voice, the dialog determination unit determines that the user has not started a dialog,
when the determined state of the user is not driving a vehicle, the detected sight line of the user is in a direction toward the voice dialogue device, and a start keyword has been detected from the voice, the dialog determination unit determines that the user has started a dialog, and
when the determined state of the user is not driving a vehicle and either the detected sight line of the user is not in the direction toward the voice dialogue device or the start keyword has not been detected from the voice, the dialog determination unit determines that the user has not started a dialog.
2. The voice dialog device according to claim 1, wherein when the voice dialog device has the dialog with the user and a termination keyword has been detected from the voice, the dialog determination unit determines that the dialog has been terminated.
3. A voice dialog method performed by a voice dialog device, comprising:
a sight line detecting step of detecting a sight line of a user;
a state determining step of determining a state of the user;
a voice processing step of obtaining voice pronounced by the user and a result of recognizing the voice;
a dialog determining step of determining whether or not the voice dialog device has a dialog with the user; and
an answer generating step of generating an answer, based on a result of recognizing the voice, wherein, the dialog determining step includes determining whether or not the user has started the dialog based on both the sight line of the user and the obtained voice by:
when state of the user determined by the state determining step is driving a vehicle, the sight line of the user detected by the sight line detecting step is in a vehicle forward direction, and a start keyword has been detected from the voice by the voice processing step, the dialog determining step determines that the user has started a dialog,
when the state of the user determined by the state determining step is driving a vehicle and either the sight line of the user detected by the sight line detecting step is not in the vehicle forward direction or the start keyword has not been detected from the voice by the voice processing step, the dialog determining step determines that the user has not started a dialog,
when the state of the user determined by the state determining step is not driving a vehicle, the sight line of the user detected by the sight line detecting step is in a direction toward the voice dialogue device, and a start keyword has been detected from the voice by the voice processing step, the dialog determining step determines that the user has started a dialog, and
when the state of the user determined by the state determining step is not driving a vehicle and either the sight line of the user detected by the sight line detecting step is not in the direction toward the voice dialogue device or the start keyword has not been detected from the voice, the start keyword has not been detected from the voice by the voice processing step, the dialog determining step determines that the user has not started a dialog.

4. A non-transitory computer readable storing medium recording a computer program for causing a computer to perform the voice dialog method according to claim 3.

* * * * *